United States Patent Office 3,813,365
Patented May 28, 1974

3,813,365
HIGH MOLECULAR WEIGHT CYCLIC NITRILE
ADDUCT COMPOSITIONS
Kurt C. Frisch, Grosse Ile, and Sidney Reegen, Oak Park,
Mich., and Jerry A. Dieter, Cherry Hill, N.J., assignors
to Atlantic Richfield Company, New York, N.Y.
No Drawing. Filed May 3, 1971, Ser. No. 139,934
The portion of the term of the patent subsequent to
Sept. 29, 1987, has been disclaimed
Int. Cl. C08g 22/00, 22/40
U.S. Cl. 260—77.5 R                               6 Claims

ABSTRACT OF THE DISCLOSURE

High molecular weight compositions useful for coatings and films are prepared by reacting
(A) a cyclic nitrile adduct having the structure

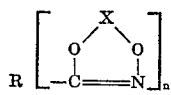

wherein R is an organic radical free of nucleophilic groups and having from 2 to about 200,000 carbon atoms, X is:

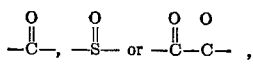

and $n$ ranges from 2 to about 100,000 with
(B) a nucleophilic organic compound having at least 2 reactive hydrogen-containing radicals selected from the group consisting of hydroxyl radicals and thiol radicals in the presence of a suitable catalyst the ratio of (A) to (B) being 1:X, with X varying from less than 1 to 0.

BACKGROUND OF THE INVENTION

Field of the invention

This invention relates to high molecular weight compositions useful as coatings, foams, films, adhesives and the like, produced from cyclic nitrile adducts alone or by reaction with less than equivalent amounts of polyols or polythiols having two or more hydroxyl or thiol groups in the molecule. Adipodinitrile carbonate is a preferred example of the cyclic nitriles.

PRIOR ART

The use of cyclic nitrile carbonates and similar compounds to make urethane type systems is described in U.S. Pat. 3,531,425. This patent describes the preparation of urethane and hydroxamate systems by reacting one equivalent of the cyclic nitrile carbonate with one equivalent of the polyol. Equivalents are expressed on the basis that one hydroxyl or thiol group reacts with one cyclic nitrile group. The instant invention differs from the systems described in the aforementioned patent in that less than one equivalent of the polyol or polythiol is reacted with the cyclic nitrile adduct with the polyol ranging down to 0 equivalents, i.e. the cyclic nitrile adduct alone being used to form the described coatings, films and the like. The instant invention also differs in that the cyclic nitrile adduct can contain from 2 up to 100,000 or more cyclic nitrile groups and such adducts can have a molecular weight ranging up to 1,000,000 or more.

SUMMARY OF THE INVENTION

In accordance with the instant invention, either low molecular weight cyclic nitrile adducts such as adipodinitrile carbonate can be employed or unsaturated cyclic nitrile adducts can be homopolymerized or copolymerized with polymerizable monomers to produce high molecular weight polycyclic nitrile compounds which can be converted to coatings, films and the like or which can be reacted with less than 1 equivalent of a polyol or polythiol to produce high molecular weight coatings, films and the like.

It is an object of this invention therefore, to produce novel high molecular weight compositions from cyclic nitrile adducts.

It is another object of this invention to produce novel high molecular weight compositions by reacting one equivalent of cyclic nitrile adduct with less than 1 equivalent of a polyol or polythiol.

It is another object of this invention to produce novel high molecular weight compositions by reacting di- or polycyclic nitrile compounds alone in the absence of polyols or polythiols.

It is a specific object of this invention to produce coating compositions from adipodinitrile carbonate.

Other objects of this invention will be apparent from the description of the invention, the preferred embodiments and from the claims.

DESCRIPTION OF THE INVENTION AND DESCRIPTION OF THE PREFERRED EMBODIMENTS

The high molecular weight compositions of this invention can be obtained from the cyclic nitrile adduct alone or in admixture with the polyol or polythiol desired, a catalyst, pigments (if desired) and a suitable solvent. The mixture is heated gently, generally not in excess of about 75° C. until a uniform mixture is obtained. This mixture is then ready for application, for example, to a substrate to be coated and is applied by normal coating application methods, such as by brushing or spraying techniques. After the coating is applied the substrate is heated at elevated temperatures, for example, from 120° C. to 150° C., for from about 15 minutes to 20 hours or more, to effect cure and to flash off the solvent. The equivalent ratio of cyclic nitrile adduct to polyol or polythiol is 1:X, where X ranges from less than 1 to 0 equivalents of the polyol or polythiol and preferably X is less than 0.5. The exact structure and type of linkage in the cured compositions is not known, although it is believed that these are not the same as when the equivalent ratio of cyclic nitrile adduct to polyol is 1:1, as disclosed in the aforementioned Pat. 3,531,425. In all cases, however, including reactions of the cyclic nitrile adduct with itself the reaction results in rupture of the cyclic nitrile ring. The reactants, catalysts, solvents are set forth in greater detail hereinafter.

The cyclic nitrile adducts

The cyclic nitrile adducts useful in this invention are represented by the structure:

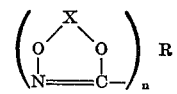

wherein R is an organic radical having from 2 to about 200,000 carbon atoms, and is free of nucleophilic groups and can be aliphatic or aromatic including cycloaliphatic, alkaryl or aralkyl radicals. For example, it can be an aliphatic polymeric chain ranging from 2 to about 200,000 carbon atoms or more to which the cyclic nitrile groups are attached. The R may be a hydrocarbon chain or it may be substituted by halogens, nitriles, esters, ethers, carboxylic acid or anhydrides, aldehydes or ketones or combinations of these dependent from the chain. The X is:

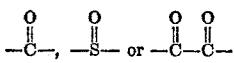

and $n$ ranges from 2 to about 100,000 or more.

The production of the low molecular weight aliphatic and aromatic cyclic nitrile adducts wherein $n$ ranges up to 4 has been described in detail in U.S. Pats. 3,531,425 and 3,652,507 both incorporated herein by reference. A preferred example of these for use in this invention is the adipodinitrile carbonate which has the structure:

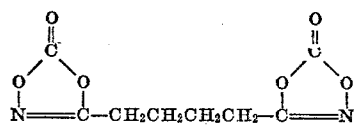

The higher molecular weight adducts, wherein $n$ is 5 or higher, can be prepared by the homopolymerization of the vinyl derivatives of the cyclic nitriles, for example, vinyl nitrile carbonate having the structure:

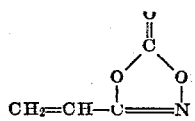

or the above described analogues

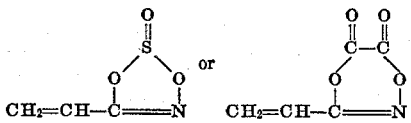

Likewise these vinyl compounds can be copolymerized with one or more polymerizable monomers, for example, olefinically unsaturated hydrocarbons, esters, ethers, aldehydes, ketones, nitriles, amides, halogen compounds, carboxylic acid or anhydride compounds and like monomers which are not nucleophilic compounds, i.e. those free of reactive hydrogen atoms as determined by the Zerewitinoff test, or free of positive metal ions or a positive ammonium ion which would react with the cyclic nitrile group. Examples are the mono- and diolefins such as ethylene, propylene, butadiene, styrene, vinyl ethers, vinyl esters, the acrylates, methacrylates, acrylonitrile, vinyl chloride, maleic anhydride and the like. The production of these high molecular polycyclic nitrile adducts is likewise disclosed in U.S. Pats. 3,480,595, and 3,652,-507, both of which are incorporated herein by reference.

The polymerization can be catalyzed by conventional polymerization catalysts, particularly of the free-radical type such as the peroxide type compounds, e.g. benzoyl peroxide, the azo compounds, ultra-violet light, and beta or gamma irradiation.

The polyol and polythiol compounds

The nucleophilic organic compounds are the polyols and polythiols having active hydrogen atoms attached to oxygen or sulfur which can be reacted with the cyclic nitrile adducts. In particular these are the aliphatic, aromatic, polyester, polyether, polylactone, polyols or polythiols and similar compounds having from 2 to 6 or more —OH or —SH groups per molecule and having molecular weights ranging from 62 for ethylene glycol to 75,000 or higher with hydroxyl numbers ranging from 12 to 1100 or more. Combinations of two or more of these compounds can also be employed.

The aliphatic and aromatic polyhydric alcohols and thiols include, for example, ethylene glycol, diethylene glycol, thiodiethylene glycol, propylene glycol, 1,3-butylene glycol, 1,6-hexanediol, butenediol, butynediol, amylene glycols, 2-methylpentanediol-2,4, 1,7-heptanediol, glycerine, neopentyl glycol, trimethylol propane, triethanol amine, pentaerythritol, cyclohexane dimethanol, sorbitol, mannitol, glactitol, talitol, xylitol, 1,2,5,6-tetrahydroxyhexane, styrene glycol, bis($\beta$-hydroxyethyl)diphenyl-dimethylmethane, silanediols, e.g. triphenyl silanols, 1,4-dihydroxybenzene and the thiol analogues thereof.

The active hydrogen-containing polymeric compounds useful in this invention include, for instance, polyhydric polyalkylene ethers, hydroxyl polyesters, hydroxyl group containing, preferably hydroxyl-group terminated, polymers, and the thiol analogues thereof. The polyhydric polyalkylene ethers may have a molecular weight greater than about 750 and an hydroxyl number of from about 40 to 150 and may be derived, for example, by the polymerization of alkylene oxides such as ethylene oxide, propylene oxide, butylene oxide and the like. Polyhydric polyalkylene ethers may also be prepared by the polymerization of the cyclic ethers such as, for example, dioxane, tetrahydrofuran and the like, and by the condensation of an alkylene oxide with a glycol such as ethylene glycol, propylene glycol, butylene glycol and the like.

The hydroxy-containing polyesters may be obtained by the reaction of aliphatic or aromatic dicarboxylic acids with aliphatic or aromatic polyhydric alcohols in the manner well known to the art in proportions that result in esters having at least two reactive hydroxy groups. Any polyhydric alcohols or thiols may be used to form the hydroxy or thiol esters and illustrative of such alcohols are those listed above in the discussion of suitable alcohols as the active hydrogen-containing reactant. Included within the suitable esters are the diglycerides, and hydroxyl-containing castor oil, tall oil, soya oil, linseed oil, etc. The latter esters are usually prepolymers prepared by the reaction of the fatty glyceride with low molecular weight polyols. Illustrative, for instance, of castor oil-based prepolymers are: propylene glycol monoricinoleate, propylene glycol mono-12-hydroxystearate, neopentyl glycol mono-ricinoleate, dehydrated castor oil, ethylene glycol minoricinoleate, ethylene glycol mono-12-hydroxystearate, triglyceride or ricinoleic acid, epoxidized castor oil, and pentaerythritol tetraricinoleate. Other suitable polymeric compounds include the hydroxyl- or thiol-terminated olefin polymers such as those of 1,4-butadiene, isoprene, 2,3-dimethylbutadiene, 2-chloro-1,3-butadiene, 2-cyano-1,3-butadiene, and other polymerizable, ethylenically unsaturated monomers such as $\alpha$-olefins of up to 12 carbon atoms such as ethylene, propylene, butene, etc.; styrene, acrylonitrile, acrylic acid or ester, methacrylic acid or ester, vinyl chloride, vinylidine chloride and the like; hydroxyl-terminated condensates of phenol and lower aldehydes and hydroxy-terminated polyepoxides.

The catalysts

The compounds which can be utilized to catalyze the reaction of the cyclic nitrile adduct with itself or with the polyol or polythiol include tertiary amines. The examples of these base catalysts are: pyridine, dimethyl aniline, triethylamine, trimethylamine, tri-n-propylamine, tri-n-butylamine, N-methylpiperidine, N-allyl-piperidine and the like.

The reaction is also catalyzed by contacting the reactants with catalytically-effective amounts of the combination of:

(I) a first metal or a mixture of metals selected from the metals of Groups III through V of the Periodic Table, and (II) a second metal or a mixture of metals selected from the metals of Groups I and II and the iron series of Group VIII of the Periodic Table.

The two metals are supplied to the catalyst combination as one or more compounds which are sufficiently soluble in the reaction mixture to allow for the metals to be dissolved in the reaction mixture in catalytically-effective amounts. Thus, the metals are not suitably employed in their insoluble elemental state in the catalyst combination. Preferably, there will be present in the catalyst combination about 0.2 to 4 molar equivalents of the first metal, i.e. the Groups III–V metal, per molar equivalent of the second metal, i.e. the Groups I, II or iron series metal. These catalysts are described in greater detail in the copending application, Ser. No. 780,878 of Burk Jr. et al., filed Dec. 3, 1968, and incorporated herein by reference.

A second series of similar metal catalysts consists of a compound of aluminum, tin, titanium, zinc, bismuth or iron which is soluble in the reaction mixture provided that the metal is in a valence state other than zero, further provided that when the metal is aluminum, tin, titanium or bismuth there is an absence of metal from Groups I, II or the iron series of Group VIII of the Periodic Table, and when the metal is zinc or iron the reaction is conducted in the absence of metals in Groups III to V of the Periodic Table. These catalysts are more fully described in U.S. Pat. 3,702,320. Patent is incorporated herein by reference.

Combinations of the aforementioned tertiary amine type catalysts with any one or combinations of the aforementioned metal compound type catalysts also can be employed.

Solvents

The solvents that are useful in this invention are those commonly employed in coating, film forming, or adhesive technology such as anhydrous ethyl acetate, methyl ethyl ketone, xylene, toluene, benzene, Cellosolve acetate (2-ethoxyethyl acetate) and the like.

Curing

The curing temperature may range from 60° C. to 200° C. A preferred range to initiate cure is 60° C. to 130° C. with 120° C. being the preferred temperature of initiation. The initiation temperature may be the cure temperature, or it may be desired to initiate the cure then raise the temperature to effect complete cure in a shorter period of time.

There is no preferred curing time since curing time depends upon the catalyst, cure temperature, equivalent ratio of the cyclic nitrile to polyol and the physical properties sought. This is illustrated in the Examples which follow.

The following Examples are provided to further illustrate the invention employing adipodinitrile carbonate as a typical cyclic nitrile adduct alone and in reaction with typical polyols and employing various catalysts, curing temperatures and times.

EXAMPLE I

To a 100 ml. resin kettle equipped with mechanical stirring was added 50 g. of polyol consisting of a condensation polymer of pentaerythritol and propylene oxide, hydroxyl No. 555. This polyol was degassed and dried by heating at 100° C. for one hour under vacuum (5 mm. Hg.). The polyol was allowed to cool at room temperature then 106 g. of Cellosolve acetate (2-ethoxyethyl acetate) which had been dried over molecular sieves, 56.49 g. of adipodinitrile carbonate and 0.113 g. of zinc octoate were added and the reaction mixture heated under a nitrogen atmosphere at 50° C. with stirring until solution was complete. The mixture contained a ratio of one equivalent of the adipodinitrile carbonate to about 0.9 equivalents of the polyol. At this point the reaction mixture is a homogeneous mixture. Films were cast from it on aluminum panels then the films baked for 3 hours at 120° C. Hard, non-tacky films resulted having tensiles of 2110 lbs./in.$^2$ and elongation of 225 percent. This Example shows that coatings and films having excellent properties can be produced from cyclic nitrile and polyol mixtures wherein the polyol is less than one equivalent per equivalent of the cyclic nitrile adduct.

EXAMPLE II

The above run was repeated except that 84.74 g. of adiponitrile carbonate, 135 g. of dry Cellosolve acetate and 0.17 g. of zinc octoate was used. Hard, non-tacky films resulted having tensile strengths of 3785 lbs./in.$^2$ and elongations of 106 percent. This shows that coatings and films having excellent properties can be produced by reacting the cyclic nitrile adduct with itself.

EXAMPLE III

The run described in Example I was repeated except that 112.98 g. of adipodinitrile carbonate, 212 g. of dry Cellosolve acetate and 0.226 g. of zinc octoate were used. Curing was for two hours at 120° C. Hard, non-tacky films resulted having tensile strengths of 5154 lbs./in.$^2$ and elongations of 55 percent. In this Example the equivalent ratio of the cyclic nitrile adduct to polyol was 1:>0.5 and excellent films were obtained.

EXAMPLE IV

The run described in Example I was repeated with the exception that 0.283 g. of aluminum isopropoxide was used in place of the zinc octoate. Hard, non-tacky films resulted having tensile strengths of 2902 lbs./in.$^2$ and elongation of 105 percent. This Example shows the successful use of another catalyst.

EXAMPLE V

The run described in Example I was repeated with the exception that 0.113 g. of stannous octoate and 0.113 g. of sodium butoxide were used in place of zinc octoate. Films cured for 7 hours at 120° C. had tensile strengths of 2935 lbs./in.$^2$ and elongations of 248 percent. Films cured for 19 hours at 120° C. had tensile strengths of 9260 lbs./in.$^2$ and elongations of 11 percent. This run shows the use of a bimetallic catalyst type with excellent results.

EXAMPLE VI

The procedure described in Example I was used to prepare films from 50 g. of polyol consisting of a condensation polymer prepared from trimethanolpropane and propylene oxide, hydroxyl No. 265, 40.41 g. of adipodinitrile carbonate and 0.16 g. of zinc octoate. This was an equivalent ratio of adipodinitrile carbonate to polyol of 1:0.6. The resulting films were slightly tacky. This Example shows the production of adhesive type films by the method of this invention.

EXAMPLE VII

To a 100 ml. resin kettle was added 50 g. of Cellosolve acetate, 50 g. of adipodinitrile carbonate, and as the catalyst a mixture of 0.10 g. of dibutyltin dilaurate and 0.10 g. of tridimethyl amino methyl phenol. The mixture was heated to 50° C. until solution was complete. Films were then cast from this solution and baked for 5 hours at 130° C. Non-tacky, hard films resulted. This run shows the use of a mixed catalyst consisting of a tertiary amine and a metal compound.

EXAMPLE VIII

In a 500 ml. 3-necked flask equipped with a mechanical stirrer, a water cooled condenser and a thermometer were placed 32.9 g. of acrylonitrile carbonate, 55.2 g. of styrene, 61.9 g. of ethyl acrylate, 2.39 g. of benzoyl peroxide and 150 g. of toluene. The reaction mixture was heated at 90° C. for 6 hours. The polymer yield was 98.0 percent after 6 hours of reaction. During the reaction the polymer separated in gel form. The polymer was found to have a molecular weight of about 25,000. This Example demonstrates the method of producing a high molecular weight cyclic nitrile adduct, where in addition to the cyclic nitrile carbonates dependent from the hydrocarbon chain there are also dependent therefrom phenyl groups and ethyl ester groups. Similar techniques can be utilized with substituted styrenes to produce dependent substituted phenyl groups or utilizing the acrylate esters to produce the corresponding dependent ester groups.

EXAMPLE IX

In a 250 ml., 3-necked flask were placed 10.97 g. of vinyl nitrile carbonate, 18.40 g. of styrene, 20.63 g. of ethyl acrylate, 0.08 g. of benzoyl peroxide, 40 g. of methyl isobutyl ketone and 10 g. of toluene. After 3 hours 0.49 g. of additional benzoyl peroxide was added. The reaction was carried out at 90° C. for 5 hours. A highly viscous polymeric composition was obtained.

To 4.53 g. of the above polymer product was added 1.64 g. of a diglycidyl ether bisphenol resin of approximately 380 molecular weight dissolved in 30 weight percent methyl isobutyl ketone and 10 weight percent of xylene and 0.082 g. of triethylene diamine. Glass panels were coated with a 3 ml. thick wet film of this material applied by using a Gardner film applicator. The coatings were baked at 93° C., for 30 minutes. The resulting cured film had a Sward hardness of 31.

The foregoing Example demonstrates that high molecular weight films and coatings can be produced by the method of this invention and that they have excellent properties.

It will be apparent from the foregoing description of the invention that there are many possible variations with respect to the reactants, catalysts, and reaction conditions that lie within the scope of this invention to produce the novel high molecular weight compositions thereof.

We claim:
1. High molecular weight compositions obtained by contacting a cyclic nitrile adduct having the structure:

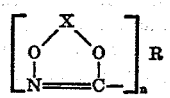

wherein R is an organic radical having from 2 to about 200,000 carbon atoms and is free of nucleophilic groups, X is:

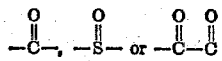

and n ranges from 2 to about 100,000 with a catalytically-effective amount of
(I) a tertiary amine, or
(II) (a) a compound of first metal or a mixture of metals selected from the metals of Groups III through V of the Periodic Table, which is soluble in the reaction mixture, and (b) A compound of second metal or mixture of metals selected from the metals of Groups I and II and the iron series of Group VIII of the Periodic Table, which is soluble in the reaction mixture, or
(III) a compound of aluminum, tin, titanium, zinc, bismuth or iron which is soluble in the reaction mixture, provided that the metal is in a valence state other than zero, further provided that when the metal compound is a compound of aluminum, tin, titanium or bismuth that said contacting is in the substantial absence of metals of Groups I, II and the iron series of Group VIII of the Periodic Table, and further provided that when the metal compound is a compound of zinc or iron that said contacting is in the substantial absence of metals of Groups III through V of the Periodic Table, or
(IV) a combination of I with II or III, said contacting being at a temperature in the range of from 60° C. to 200° C.

2. The composition according to claim 1, wherein the cyclic nitrile adduct is adipodnitrile carbonate.

3. The composition according to claim 1, wherein the cyclic nitrile adduct is a polymer of a monomer selected from the group consisting of the vinyl cyclic nitriles having the structure:

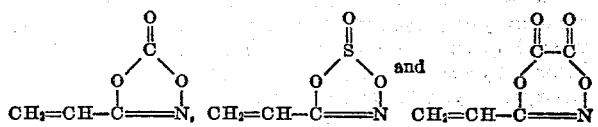

4. The composition according to claim 3, wherein said vinyl cyclic nitriles are copolymerized with an olefinically unsaturated monomer which is free of reactive hydrogen atoms, positive metal ions or a positive ammonium ion.

5. The composition according to claim 4, wherein said cyclic nitrile is the vinyl nitrile carbonate and said olefinically unsaturated monomers are styrene and ethyl acrylate.

6. The composition according to claim 1, wherein the catalyst is selected from said Group (IV) catalysts.

References Cited
UNITED STATES PATENTS

| | | | |
|---|---|---|---|
| 3,652,507 | 3/1972 | Burk et al. | 260—77.5 AB |
| 3,480,595 | 11/1969 | Burk et al. | 260—77.5 R |
| 3,531,425 | 9/1970 | Burk et al. | 260—859 R |
| 3,702,320 | 11/1972 | Fritok et al. | 260—859 PV |

MAURICE J. WELSH, Primary Examiner

U.S. Cl. X.R.

260—775. AB, 77.5 AC